Figure 4:
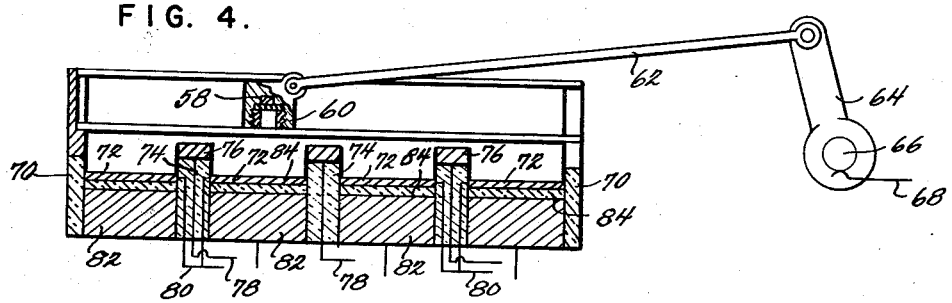

Oct. 8, 1957     J. H. COLEMAN     2,809,306
NUCLEAR CURRENT CONVERTER
Filed Aug. 15, 1951     3 Sheets-Sheet 1
FIG. 1.
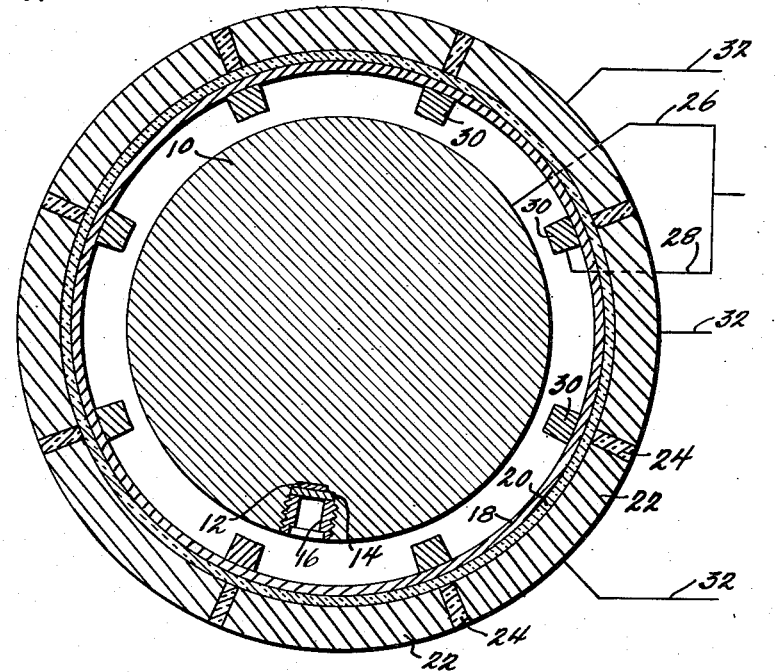
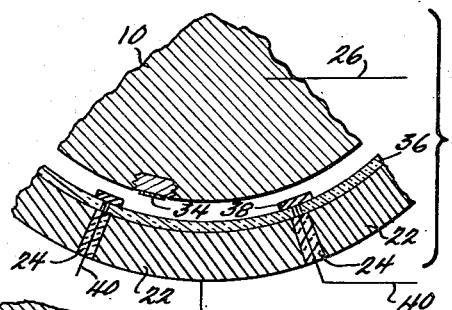
FIG. 2.
FIG. 3.
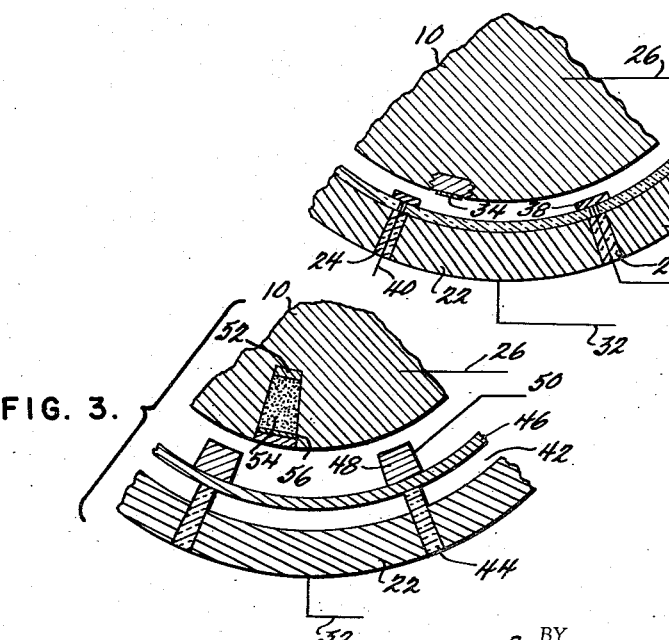
INVENTOR
JOHN H. COLEMAN
BY
ATTORNEYS Oct. 8, 1957  J. H. COLEMAN  2,809,306
NUCLEAR CURRENT CONVERTER
Filed Aug. 15, 1951  3 Sheets-Sheet 2

INVENTOR
JOHN H. COLEMAN

BY
ATTORNEYS

Oct. 8, 1957  J. H. COLEMAN  2,809,306
NUCLEAR CURRENT CONVERTER
Filed Aug. 15, 1951  3 Sheets-Sheet 3

INVENTOR
JOHN H. COLEMAN

BY
*Semmes, Keegin, Robinson & Semmes*
ATTORNEYS

United States Patent Office 2,809,306
Patented Oct. 8, 1957

2,809,306

NUCLEAR CURRENT CONVERTER

John H. Coleman, West Palm Beach, Fla., assignor to Radiation Research Corporation, Palm Beach, Fla., a corporation of Florida Application August 15, 1951, Serial No. 242,011

4 Claims. (Cl. 310—3)

This invention pertains generally to electric switches, and more particularly to methods and means for utilizing the kinetic energy of nuclear reactions to provide for control of the electrical impedance between electrodes in a desired time sequence.

Conventional electric switches utilize a moving conductor to alter the impedance between terminals or electrodes. For example, a familiar form of multipole switch employs a central rotary shaft carrying a conductive brush which can make contact with a plurality of poles or terminals spaced in an arcuate array about the shaft. Such a switch has a limited life, due to abrasion between the moving contact brush and the fixed contacts, and it is also subject to failure when dust particles become lodged upon the contact surfaces, or when any cause interferes with the making of contact in the desired sequence.

Various other forms of switches have been proposed. Electronic switches of the flip-flop (multivibrator or Eccles-Jordan) type eliminate the need for physical contacts, but they require elaborate external power supplies for the vacuum tubes employed. Capacitor type switches, in which the external circuit is completed through the capacitance existing between a rotary member and one of a plurality of fixed plates, have found limited application, for example in antenna switching. All such devices have objectionable features or limitations, which it is an object of the present invention to overcome.

In general, the present invention proposes the utilization of the kinetic energy of nuclear disintegration to provide a switch requiring relatively few external power supplies. It is an important object of the invention to provide a design for, and a method of operation of, a switch which does not require physical contacts to be made and broken to control circuits.

Another object of the invention is to provide a multipole switch in which desired circuits can be completed in a desired order, and in which the "open-circuit" impedance between terminals can be made very large; that is, one in which the open-circuit internal resistance is high, and the leakage current very low. At the same time, the invention provides a relatively low closed-circuit impedance, so that the change of impedance between the two conditions is large.

Still another object of the invention is to provide a time-controlled multipole switch employing nuclear energy for the switching function, and free from the objections to the use of physical contacts for circuit control.

An additional object of the invention is to provide a switch in which the impedance between poles, when in closed circuit condition, can be controlled in accordance with input signals.

A further object of the invention is to provide a switch of the above type which utilizes the induced conductivity effect and the electrostatic hysteresis effect resulting from the building up of space charge in an insulator under potential stress, which can be extracted as useful electric current upon reduction of the potential stress. This aspect of the invention is described in my copending application, Serial No. 235,182, filed July 5, 1951, and entitled "Method of and Means for Collecting Electrical Energy of Nuclear Reactions."

Figure 5:
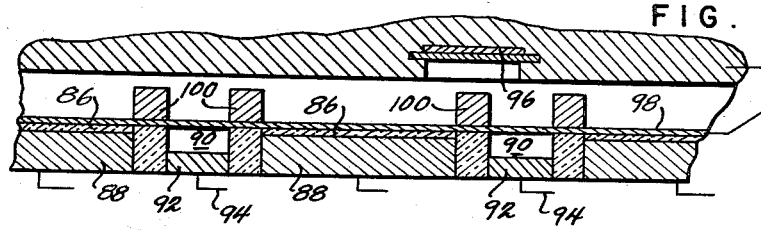
Figure 6:
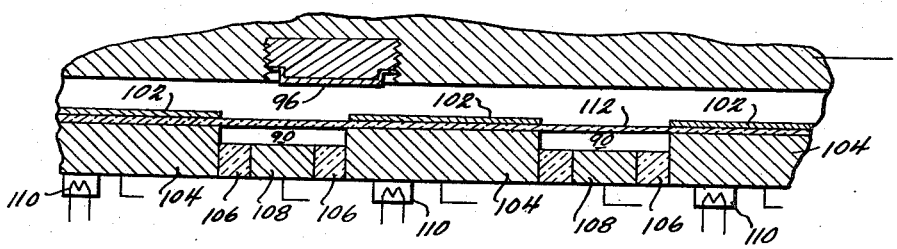
Figure 7:
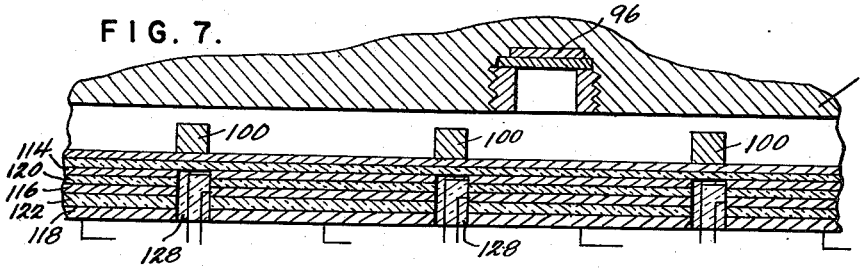
Figure 8:
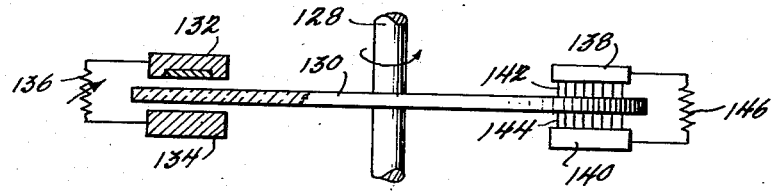
Figure 9:
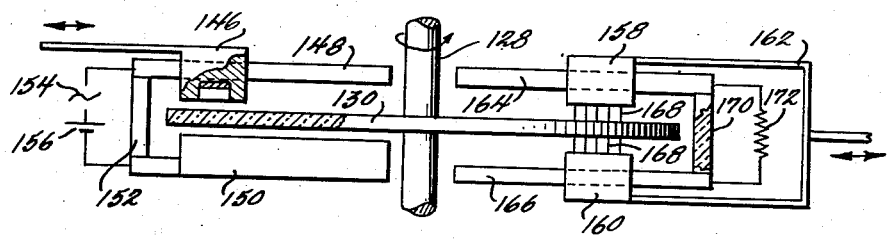
Figure 10:
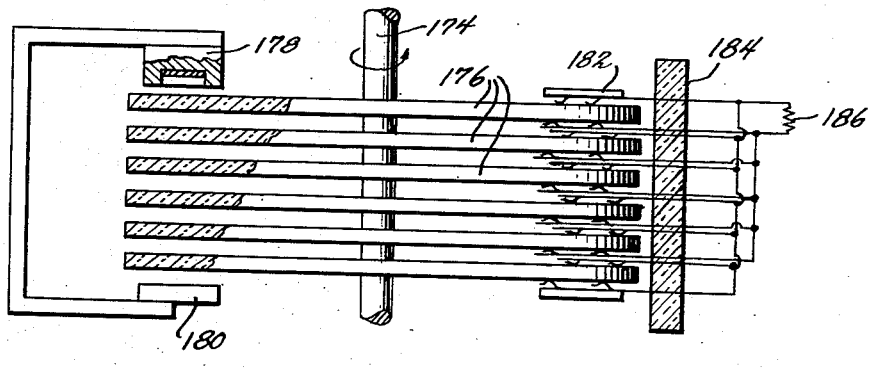

The above and other objects and advantages of my invention will best be understood from the following detailed specification of certain preferred embodiments thereof, given by way of example, reference being made to the appended drawings, in which:

Fig. 1 is a horizontal sectional view of one form of switch employing cylindrical symmetry, and having a solid dielectric and a source of Beta radiation, Fig. 2 is a fragmentary sectional view similar to Fig. 1 but employing an Alpha radiation source, Fig. 3 is a view similar to Fig. 2 but showing a form of the invention employing a gaseous dielectric and a fission source of radiation, Fig. 4 is a longitudinal cross-sectional view of a form of switch employing planar geometry having individual sets of input and output electrodes, rather than a common electrode as in the previous forms, Fig. 5 is a similar view, to a larger scale, of a planar form of the invention utilizing features shown in Figs. 1 and 3, Fig. 6 is a similar view combining features shown in Figs. 3 and 4, Fig. 7 is an illustration of a multiple collector electrode structure in an arrangement otherwise similar to that of Fig. 1, Fig. 8 is a view, partly in vertical section, of a structure having cylindrical symmetry and utilizing a rotating dielectric body instead of the movable nuclear source of previous examples, Fig. 9 is a view of a form similar to Fig. 8 but employing both a movable radiation source and movable electrodes, and Fig. 10 is a combination of several units of the Fig. 9 type, and providing direct transformation of voltage to current in a high efficiency structure.

Referring now to the drawings, and specifically to Fig. 1 thereof, there is shown a switch comprising a cylindrical shaft 10 having a cavity extending inward from its peripheral surface and containing a quantity of a radioactive isotope 12 such as strontium 90. A thin metal sheet 14, such as stainless steel having a thickness of .002 inch, is pressed against the isotope 12 by a plug 16 threaded in the cavity, said plug having a central bore through which the radiation from the isotope 12 can pass. The shaft 10 can be rotated within a surrounding cylindrical shell 18 formed for example of .002 inch aluminum sheet and concentric with the axis of shaft 10. Outside this aluminum cylinder is a cylinder 20 of a thin dielectric material such as .002 inch polystyrene. Finally, collecting electrodes 22, which may be segments of conductive material, are disposed outside the dielectric cylinder 20. These collecting electrodes may be assembled, as shown, with intervening insulating spacers 24 so as to form a complete cylindrical collecting assembly.

Connections for the external circuits are illustrated in Fig. 1, these comprising a lead 26 from the rotary shaft 10 and a lead 28 from a plurality of metallic shields 30, which may be blocks of metal secured to and in contact with the aluminum cylinder 18. The leads from these elements may be brought out at the end of the assembly, while leads 32 are provided from the individual collecting electrodes 22. Leads 26 and 28 are shown as connected together, so as to maintain the shields 30 at the potential of shaft 10.

In operation, the shaft 10 is rotated, as by a motor or manually, so that the radiation from source 12 is directed sequentially between the electrode cylinder 18 and the respective collector electrodes 22. The electric current flowing between these two electrodes can be the result of three effects: (1) the primary beta radiation, (2) the induced conductivity in the dielectric body 20, and (3) the induced space charge in such body. The first, or primary radiation effect, is proportional to the quantity of isotope or radioactive material 12. The second effect, induced conductivity, is a function of the quantity of the radiation and the type of dielectric employed. For example, the polystyrene dielectric mentioned above, and polyethylene, are reduced in volume resistivity (which follows Ohm's law under equilibrium conditions) from around $10^{20}$ down to $10^{15}$ ohm-centimeters, while amber is reduced less and arsenic sulphide is reduced more. The time required for the resistance to reach equilibrium limits the speed of motion of the shaft 10 that can be employed when the induced conductivity effect is utilized; however, we have found the breakdown and recovery time of amber and arsenic sulfide to be in the milli-second range. The recovery time for polystyrene is considerably longer being in the range of hours.

The third effect, which I call electrostatic hysteresis, results in a current flow between electrodes which is greater than the equilibrium value when the voltage is undergoing change. Thus, I have found that when the inter-electrode potential difference has been reduced from some initial value of equilibrium current flow down to zero, current continues to flow. The amount of current that flows at zero potential difference is a function of the initial potential difference and the quantity of the radiation. Fig. 2 of the application referred to above illustrates this effect for both positive to negative and negative to positive potential changes.

Since the insulating spacers 24 between the electrodes 22 would be subjected to radiation during the passage of the source 12 thereover, the relatively thick radiation shields 30 are provided to absorb such radiation; since these shields 30 are connected to cylinder 18, and thereby with one another, the lead 28 can be connected to lead 26 from cylinder 10 and all of these adjusted to the same potential. Thus, no current can flow due to the ions formed by collision of the nuclear radiation with neutral air molecules existing between shaft 10 and cylinder 18.

Rotation of shaft 10 thus cyclically lowers the electrical impedance between lead 26 and leads 32 from the respective collector electrodes 22, and in effect provides an electrical current-carrying connection between these parts, permitting the control of external current-carrying apparatus. Vacuum tubes or sensitive relays may be controlled in this manner, and all of the switching functions of conventional mechanical switches can be achieved. Also, since the switch in effect lowers the impedance between the electrodes in sequence, suitable impedance-sensitive bridge circuits may also be controlled.

In Fig. 2, a modified form of the invention is shown, in which radiation from a source 34 is used to form a relatively low-resistance path between the shaft 10 and the surface of a cylindrical insulator body 36. In this case, the source 34 produces Alpha radiation, and since this radiation has less penetrating power than the Beta radiation, thinner shields 38 may be employed to protect the insulating segments 24. In this form of the invention, there is no element corresponding to the electrode cylinder 18 of Fig. 1; as most of the ions formed by atmospheric collision will re-combine to neutral molecules in a region after the radiation beam has passed by, the conducting path between shaft 10 and a particular collector segment 22 will be removed, even though the insulating segment 24 next preceding may still be conducting. The shielding elements 38 can be connected as by leads 40 to an external potential such as that applied to shaft 10 via lead 26, to guard against leakage across the surfaces of the insulator segments 24. The leads 40 in this figure are shown as brought out through the insulator segments 24, but they may equally well be brought out the end of the cylindrical assembly.

Fig. 3 of the drawings illustrates a modification similar to Fig. 1 but employing a gaseous dielectric, and utilizing a fission type of radiation source. Again, numeral 10 designates the rotary shaft having connecting lead 26, and surrounded by the thin conductive cylinder 46. The outermost cylinder formed by the collector electrode segments 22 is separated from electrode cylinder 46 by a space 42 containing a suitable gas, and the collector electrode segments are separated from one another by the insulator segments 44 which may also operate to support the conductive cylinder 46. Shields 48 and their leads 50 are also illustrated. In an actual embodiment of such a construction having a space of ⅛" between electrode 46 and electrodes 22, and using air as a dielectric, the volume resistivity changed from greater than $10^{20}$ ohm-centimeters to $10^{10}$ ohm-centimeters with an applied potential up to about 10 volts, with fast starting and recovery times.

Fig. 3 also illustrates a modified radiation source of the fission type; the cavity in shaft 10 contains a neutron source 52 such as a standard radium beryllium gun adjacent to a moderator 54, which may for example be paraffine wax, to slow the emitted neutrons down to thermal velocities. The slow neutrons impinging upon the uranium 235 contained in the enriched foil 56 produce fission therein and consequent radiation of the desired type.

It is to be understood that any of the three nuclear reactions described above can be employed, and even other types of reactions, in connection with any of the various geometrical arrangements of the apparatus heretofore or hereinafter set forth, within the known limits of penetrative power and other obvious controlling factors well known to those skilled in the nucleonics field.

Fig. 4 of the drawings illustrates a modified arrangement employing a linear arrangement of the parts as contrasted with the circular arrays of the preceding figures. In this figure, numeral 58 designates the radiation source which may again be a Beta isotope as described in connection with Fig. 1, contained in a slidable block or piston 60 of suitable metal such as cold rolled steel. This source is arranged for sliding movement upon suitable guides, and is moved by a rod 62 connected pivotally to a crank or wheel 64 rotated by a shaft 66 to which one connecting lead 68 is secured; a slip-ring arrangement can obviously be employed where continuous rotation in one direction is desired. Naturally, the parts between shaft 66 and the radiation source are in electrical circuit. Rotation of shaft 66 moves the piston or block 60 back and forth above the electrode assembly which may support the guides or tracks as by insulator blocks 70.

The electrode assembly in this form of the invention provides completely independent sets of input and output terminals. To this end, individual rectangular metallic sheets 72 are separated by insulators 74 whose end faces are guarded by strips 76 such as copper to prevent induced conductivity between adjacent electrodes 72, and these strips 76 are connected to an external source of potential as by leads 78 to prevent leakage currents across the insulator faces. As in previously described embodiments, the leads 80 from electrodes 72 may be connected to the same potential source as lead 68 in order to prevent flow of ionization currents from the source 58, 60 to the electrodes 72. Obviously, connections to the guides for the block 60 could be employed instead of the shaft connecting lead 68. The electrodes 82 are individually insulated from electrodes 72 by insulation 84 which may be of the same or similar materials as described in connection with the previous embodiments.

Fig. 5 illustrates a combined modification employing solid insulation 86 for certain electrodes 88, and gaseous insulation or dielectric material indicated by 90 for others 92 of the electrodes. Various combinations are thus possible to produce special results. Only certain of the electrode connections are shown in Fig. 5, it being understood that the other necessary connecting leads are provided in accordance with the principles set forth above.

A typical operational advantage illustrated in Fig. 5 is that the source 96 may be made wide enough so that the relatively lower resistance gaseous dielectric 90 is irradiated while the trailing edge of the insulation 86 is still receiving radiation. Electrode 92 is grounded through lead 94, and thus the common electrode 98 is grounded to provide rapid recovery. As the source 96 passes on to the next section, the solid insulation 86 will then be irradiated while the gaseous insulation is still undergoing irradiation, and the starting time is also decreased. The shields or absorbers 100 can be omitted when this type of operation is employed.

The embodiment of Fig. 6 is generally similar to that of Fig. 5, except that individual electrodes 102 constitute the output electrodes (say), while the individual input electrodes 104 find a low-resistance path to ground when the unshielded insulation 106 separating the latter is irradiated, the conductive path leading to the grounded electrodes 108 when these unshielded insulators 106 are undergoing irradiation. This produces the same effect as in Fig. 5 with respect to increased speed of starting and recovery.

Also shown in Fig. 6 are temperature control elements 110; for example, electrical resistance heaters in heat-transferring relation to electrodes 104 and thereby to insulation 112 between the input and output electrodes. As is known, the conducting characteristics of insulators can be controlled by varying their temperature in this manner. It is to be understood that these control elements 110 are merely exemplary; refrigeration can also be employed, and any such elements may be automatically controlled by external means.

In Fig. 7, multiple collector electrodes 114, 116, 118 are shown, separated by solid insulating layers 120, 122. Connecting leads 126 for the electrodes can be brought out through the insulating spacers 128 or otherwise. Parallel operation to lower the output resistance can be obtained in this way, by connecting the leads from alternate electrode layers together as an input lead, and the remaining electrodes together as an output lead. Various other connection arrangements are possible.

Fig. 8 of the drawings shows a switch of somewhat different construction, but employing the same principles as the forms described above. In this arrangement, a shaft 128 which is arranged to be rotated as desired, carries a dielectric disc 130 a part of which is irradiated by the radioactive source in a holder 132. The receiver electrode 134 is connected to the source holder by a circuit including a variable resistor 136, the parts being made of common metals such as copper or steel. The resistor controls the charging rate and the total charge bound upon the intervening area of the disc 130. As shaft 128 is rotated, the charged area of the disc ultimately passes between electrodes 138 and 140, and is picked off by brushes represented as springy contact fingers 142, 144. The current is led off to a utilization circuit 146 by suitable connections. Rotation of the disc 130 provides continuous operation with a desired time delay between the controlling impulse and the establishment of current in the output circuit.

An elaboration of the system just described is illustrated in Fig. 9, in which the source 146 is carried by an arm which can be moved radially with respect to the disc 130. The guide 148 for the source is insulated as at 152 from the (fixed) collector 150, so that the external circuit may include a bias battery or like source 156 and a source of control potential indicated schematically at 154. A modulating signal can thus be used to vary the pattern of charge and voltage carried by the disc. These patterns can be internal space charge as described in connection with Fig. 1, or an overall potential drop between the two surfaces of the disc. If the charge is extracted in the load at a different potential, the electrostatic hysteresis will contribute an additional component of current which depends upon the total voltage to which the area of dielectric disc 130 under consideration was charged during its irradiation.

The receiver or charge pick-off assembly in Fig. 9 may again utilize brushes 168 carried by holders 158, 160 secured to a yoke 162 movable as indicated by the arrowheads, the guides or tracks 164, 166 being insulated as at 170 from one another, with the external circuit 172 connected between the holders as indicated. The radial motions of the radioactive source and of the pick-off unit may be obtained in any desired way. Clearly, the length of time between the establishment of a charge on a given elemental area of disc 130 and its reception at the pick-off device may be greatly extended as compared with the case of immovable source and pick-off; for example, by causing the charge to move through several revolutions before the pick-off unit is brought to a position where it receives such charge. Other types of operation can readily be visualized.

Fig. 10 illustrates a further elaboration in that the shaft 174 carries a plurality of spaced dielectric discs 176, the source 178 projecting radiation through all of these discs onto the collector 180. At another radial position, a plurality of charge pick-off devices 182, again shown as resilient brushes or fingers contacting the opposite surfaces of the disc, are provided, and alternate pick-off leads are connected to the respective sides of the utilization circuit 186, here shown as a load resistor. The pick-off units may be supported as by having their support wires embedded in the block of insulating material 184. When the discs are rotated, the induced voltages are taken off in parallel, so that a voltage step-down, and corresponding current step-up, is achieved. In the embodiment shown, this transformation ratio will be six to one. It will be understood that an input modulation signal can be applied to all of the discs in series at the irradiation point, or to individual discs, by employing means such as those shown in Fig. 9.

While the invention has been disclosed herein in certain selected and preferred embodiments for purposes of illustration, it is to be understood that various other applications of the principles disclosed can be made, and that modifications in structural details and arrangements can readily be effected by those skilled in this art without departing from the spirit of the invention as defined in the following claims.

I claim:

1. In combination, a solid dielectric in the form of a sheet, a radiation source, means for rotating said dielectric sheet with respect to said source in a predetermined manner to establish a charge pattern on said dielectric, and means for converting said charge pattern to a useful electrical output.

2. The invention in accordance with claim 1, in which said dielectric comprises a plurality of spaced-apart dielectric sheets and in which said moving means comprises means for simultaneously rotating all said sheets.

3. The invention in accordance with claim 2, in which means are provided for picking off the charge patterns on said discs in a predetermined manner to effect voltage and current transformation.

4. A direct current voltage and current transformer comprising radioactive means for establishing a plurality of electrical charges in solid dielectrics, and means operatively associated with said dielectrics for deriving current from said charges by taking off induced voltages in parallel.

(References on following page)

References Cited in the file of this patent

UNITED STATES PATENTS

| | | |
|---|---|---|
| 2,399,061 | Rosenblum | Apr. 23, 1946 |
| 2,562,138 | Bump et al. | July 24, 1951 |
| 2,604,596 | Ahearn | July 22, 1952 |
| 2,650,311 | Bray et al. | Aug. 25, 1953 |

OTHER REFERENCES

Nuclear Electrostatic Generator, Linder. The Physical Review, vol. 71, No. 2, pp. 129–130, Jan. 15, 1947.